US008352075B2

(12) United States Patent
Cho et al.

(10) Patent No.: US 8,352,075 B2
(45) Date of Patent: Jan. 8, 2013

(54) APPARATUS AND METHOD FOR EXTRACTING FEATURE INFORMATION OF OBJECT AND APPARATUS AND METHOD FOR CREATING FEATURE MAP

(75) Inventors: Joon-kee Cho, Yongin-si (KR); Yeon-ho Kim, Yongin-si (KR); Dong-ryeol Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 503 days.

(21) Appl. No.: 12/457,203

(22) Filed: Jun. 3, 2009

(65) Prior Publication Data

US 2010/0114374 A1     May 6, 2010

(30) Foreign Application Priority Data

Nov. 3, 2008     (KR) ...................... 10-2008-00108438

(51) Int. Cl.
    *G05B 15/00*     (2006.01)
(52) U.S. Cl. ......... 700/259; 700/245; 700/253; 700/258
(58) Field of Classification Search .................. None
    See application file for complete search history.

(56) References Cited

U.S. PATENT DOCUMENTS

| 4,731,860 | A  * | 3/1988  | Wahl .............................. 382/281 |
| 6,420,694 | B1 * | 7/2002  | Greenwood ................... 250/221 |
| 6,456,728 | B1 * | 9/2002  | Doi et al. ...................... 382/103 |
| 6,826,293 | B2 * | 11/2004 | Matsunaga .................... 382/106 |
| 6,959,104 | B2 * | 10/2005 | Rajagopal et al. ............. 382/107 |
| 7,162,338 | B2 * | 1/2007  | Goncalves et al. .............. 701/23 |
| 7,421,338 | B2 * | 9/2008  | Kim et al. ...................... 701/514 |
| 7,536,029 | B2 * | 5/2009  | Choi et al. ..................... 382/103 |
| 7,720,554 | B2 * | 5/2010  | DiBernardo et al. ........... 700/56 |
| 7,912,583 | B2 * | 3/2011  | Gutmann et al. .............. 700/245 |
| 2002/0135578 | A1 * | 9/2002  | Wenzel et al. ................. 345/442 |
| 2005/0033474 | A1 * | 2/2005  | Kim et al. ..................... 700/245 |
| 2005/0213082 | A1 * | 9/2005  | DiBernardo et al. ..... 356/139.03 |
| 2005/0232511 | A1 * | 10/2005 | Ziou et al. ..................... 382/276 |
| 2005/0238200 | A1 * | 10/2005 | Gupta et al. .................. 382/103 |
| 2006/0017720 | A1 * | 1/2006  | Li ................................. 345/419 |
| 2006/0025888 | A1 * | 2/2006  | Gutmann et al. ............. 700/245 |

(Continued)

FOREIGN PATENT DOCUMENTS

JP     5-297141     11/1993

(Continued)

OTHER PUBLICATIONS

Partial English Translation of Chinese Office Action for Chinese Patent Application No. 200910157574.9, mailed on Jun. 4, 2012.

*Primary Examiner* — Khoi Tran
*Assistant Examiner* — Jonathan L Sample
(74) *Attorney, Agent, or Firm* — Staas & Halsey LLP (57) ABSTRACT

Technology for creating a feature map for localizing a mobile robot and extracting feature information of surroundings is provided. According to one aspect, feature information including a reflection function is extracted from information acquired using a 3D distance sensor and used as a basis for creating a feature map. Thus, a feature map that is less sensitive to change in the surrounding environment can be created, and a success rate of feature matching can be increased.

19 Claims, 10 Drawing Sheets

U.S. PATENT DOCUMENTS

| | | | |
|---|---|---|---|
| 2006/0075422 A1* | 4/2006 | Choi et al. | 725/18 |
| 2006/0115160 A1* | 6/2006 | Jung et al. | 382/199 |
| 2006/0136097 A1* | 6/2006 | Kim et al. | 700/258 |
| 2006/0165276 A1* | 7/2006 | Hong et al. | 382/153 |
| 2008/0037862 A1* | 2/2008 | Jeon et al. | 382/154 |
| 2009/0059041 A1* | 3/2009 | Kwon | 348/241 |
| 2009/0125175 A1* | 5/2009 | Park et al. | 701/28 |
| 2009/0133467 A1* | 5/2009 | Mori et al. | 73/1.77 |
| 2010/0070078 A1* | 3/2010 | Kong et al. | 700/259 |
| 2010/0114374 A1* | 5/2010 | Cho et al. | 700/259 |

FOREIGN PATENT DOCUMENTS

| | | |
|---|---|---|
| JP | 2003-281686 | 10/2003 |
| JP | 2003-348459 | 12/2003 |
| JP | 2004-333505 | 11/2004 |
| JP | 2006-53698 | 2/2006 |
| KR | 10-2006-0033497 | 4/2006 |
| KR | 10-2006-0095173 | 8/2006 |

* cited by examiner

APPARATUS AND METHOD FOR EXTRACTING FEATURE INFORMATION OF OBJECT AND APPARATUS AND METHOD FOR CREATING FEATURE MAP

CROSS-REFERENCE TO RELATED APPLICATIONS

This application claims the priority benefit under 35 U.S.C. §119(a) of Korean Patent Application No. 10-2008-0108438, filed on Nov. 3, 2008, the disclosure of which is incorporated herein in its entirety by reference.

BACKGROUND

1. Field

Exemplary embodiments relate to technology for extracting feature information from nearby objects and using the extracted feature information to create a feature map for localization of a mobile robot.

2. Description of the Related Art

Several maps are used in mobile robots depending on purpose of use, but grid maps and feature maps are used the most.

Grid maps are a type of map in which a grid of fixed size is used to reflect and store the position and shape of the surrounding environment and obstacles as they are. Grid maps are very intuitive and easy to work with but have the disadvantage of drastic increase in memory required as the robot's use space becomes larger.

In contrast, feature maps detect and store only required feature information about the surrounding environment and obstacles, such as location and color, and thus do not require much memory. However, it is relatively dependent on feature detection capabilities of a system.

In order to create a feature map, a method of installing a camera in the robot and using image information obtained from the camera to extract features of surrounding objects is often used.

However, in order to localize the robot, currently extracted features must match registered features, but the image information from the camera has a problem that it is not easy to compensate for image scaling, rotation and affine curvature due to variation in lighting and robot location. Consequently, matching capability is very limited.

Accordingly, there is need for a method of creating a feature map that is less sensitive to variation in the surrounding environment and extracts feature information more efficiently.

SUMMARY

Exemplary embodiments relate to an apparatus and method for creating a feature map using feature information such as distance information, planar patch information, reflection function information, etc. Feature information may be detected using a 3D distance sensor.

According to an exemplary aspect, a feature information extraction apparatus includes: a sensor to detect light reflected from surrounding objects to acquire distance information and remission information regarding the surrounding objects; a corner detector to detect corner information regarding the surrounding objects using the remission information; a plane detector to detect information of a planar patch using the corner information and distance information of corresponding corner surroundings; and a reflection function detector to detect a reflection function of the planar patch using the remission information depending on angle of light incident on the planar patch.

According to another exemplary aspect, a feature map creation apparatus includes: a sensor, mounted on the robot, to detect light reflected from surrounding objects to acquire distance information and remission information regarding the surrounding objects; and a data processor to extract corner information, planar patch information, and feature information including a reflection function of a planar patch, regarding the surrounding objects, from the distance information and remission information, and to store the extracted feature information to create a feature map.

According to still another exemplary aspect, a feature information extraction method includes: detecting light reflected from surrounding objects to acquire distance information and remission information regarding the surrounding objects; detecting corner location coordinates regarding the surrounding objects as corner information based on the remission information; establishing a cube centered on the corner location coordinates using the detected corner location coordinates and distance information of corresponding corner surroundings, and detecting planar patch information from distance information included in the cube; detecting a reflection function of the planar patch using the remission information which depends on angle of light incident on the planar patch; and extracting and storing at least one of the corner information, planar patch, and reflection function as the feature information.

According to yet another exemplary aspect, a feature map creation method includes: detecting light reflected from surrounding objects to acquire distance information and remission information regarding the surrounding objects; detecting corner location coordinates regarding the surrounding objects as corner information based on the remission information; establishing a cube centered on the corner location coordinates using the detected corner location coordinates and distance information of corresponding corner surroundings, and detecting information of a planar patch from distance information included in the cube; detecting a reflection function of the planar patch using remission information which depends on angle of light incident on the planar patch; extracting and storing at least one of the corner information, planar patch, and reflection function as feature information; and matching currently detected feature information with previously stored feature information to correct the position of the robot and update the stored feature information.

The remission information may be an amount of light reflected from surrounding objects or a plane image created based on the amount of light reflected from surrounding objects. Also, the corner information may be location coordinates of a corresponding corner. The planar patch information may be plane equation parameters regarding a corresponding planar patch, and the reflection function may be a function expressing remission information which depends on angle of incidence of light with respect to a corresponding planar patch.

Above, it is possible for corners to be detected based on scale invariant feature transform (SIFT) or Harris algorithms. The planar patch may be obtained by applying a plane detection algorithm using a least squares method (LSM) to distance information inside the cube centered on the detected corner when the cube is established and outputting a plane. The reflection function may be computed through curve fitting a Gaussian function to the remission information which depends on angle of light incident on the planar patch.

According to yet another exemplary aspect, there is provided at least one computer readable medium storing computer readable instructions to implement methods of exemplary embodiments.

It is to be understood that both the foregoing general description and the following detailed description are exemplary and explanatory.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the disclosure by referring to the figures.

Exemplary embodiments may, however, be embodied in many different forms and should not be construed as limited to exemplary embodiments set forth herein. Rather, these exemplary embodiments are provided so that this disclosure is thorough, and will fully convey the scope of the disclosure to those skilled in the art. In the drawings, the size and relative sizes of layers and regions may be exaggerated for clarity. Like reference numerals in the drawings denote like elements.

A feature information extraction apparatus and method, and a feature map creating apparatus and method using the extracted feature information, will be described in detail below with reference to the attached drawings. In this description, terms used herein are just defined by considering various functions and thus may vary according to a user's intentions or customs. Therefore, those definitions have to be appreciated on the basis of the entire disclosure of this application.

The apparatus and method described through exemplary embodiments presented herein can be applied to a mobile robot performing tasks while moving within a predetermined range, such as a search robot probing a specified area or a cleaning robot for house cleaning. In order for the robot to perform tasks while moving within a predetermined range, the robot recognizes its own location. To perform localization, the robot has or obtains information about its surroundings. A representative example of information about the robot's surroundings is a feature map. Accordingly, the apparatus and method described through exemplary embodiments presented herein can be applied to a mobile robot to extract feature information or can be used to create a feature map using extracted feature information.

For example, in the case of a feature information extraction apparatus or a feature map creation apparatus, the apparatus may include a sensor mounted on a robot and a data processor processing information acquired by the sensor. Here, the data processor may be implemented via software in a microcomputer or control chip for performing control, or it may be formed as a separate data processing chip.

Figure 1:
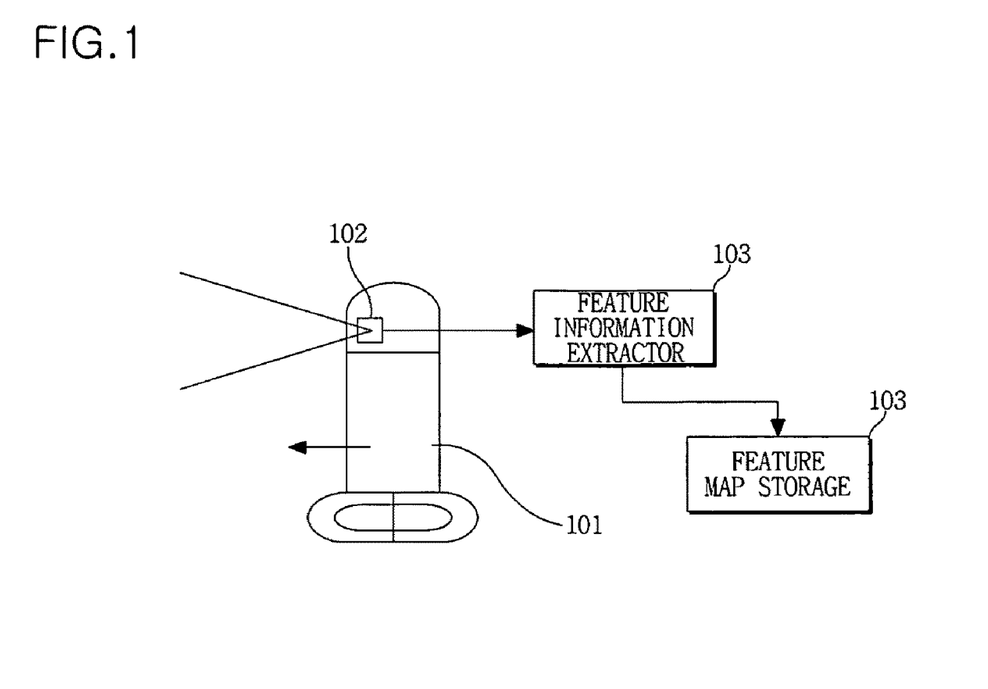
FIG. 1 illustrates a robot according to an exemplary embodiment.

FIG. 1 illustrates a mobile robot and an apparatus for extracting feature information for creating a feature map for localization of such a mobile robot according to an exemplary embodiment.

Referring to FIG. 1, a robot 101 performs specified tasks while moving within a predetermined range, as described above. In order to move, the robot 101 has to recognize its own location (localization), and it is possible for the robot's location to be recognized using a map of surrounding features stored in a feature map storage 104. Accordingly, before the robot 101 performs its specified tasks, the feature map has to be constructed in advance. It is possible for the feature map to be directly input by a user or created by the robot 101 as it probes the surrounding area.

FIG. 1 illustrates the robot 101 extracting feature information regarding objects such as obstacles as it probes the surrounding area, and using the extracted feature information to construct a feature map.

In FIG. 1, a sensor 102 is installed in the robot 102 and emits light to the surroundings. Also, the sensor 102 detects light reflected from surrounding objects to acquire information on the surroundings. For example, the sensor 102 may be a 3D distance sensor that scans the surroundings with a laser and detects reflected laser light.

The information on the surroundings acquired by the sensor 102 may be distance information and remission information regarding objects. The distance information can be calculated using the time the light is emitted and the time reflected light arrives, and the remission information can be obtained by measuring the amount of light reflected.

A feature information extractor 103 extracts feature information of surrounding objects for creating a feature map using the distance information and remission information acquired by the sensor 102. Here, the extracted information may be object corner information (e.g., corner location coordinates), planar patch information (e.g., plane equation parameters regarding a specified plane), a reflection function (e.g., light reflection amount according to light incidence angle regarding a specified plane), etc.

A feature map storage 103 stores feature information extracted by the feature information extractor 103. That is, the assembly of feature information extracted by the feature information extractor 103 may be understood as constituting a feature map.

Figure 2:
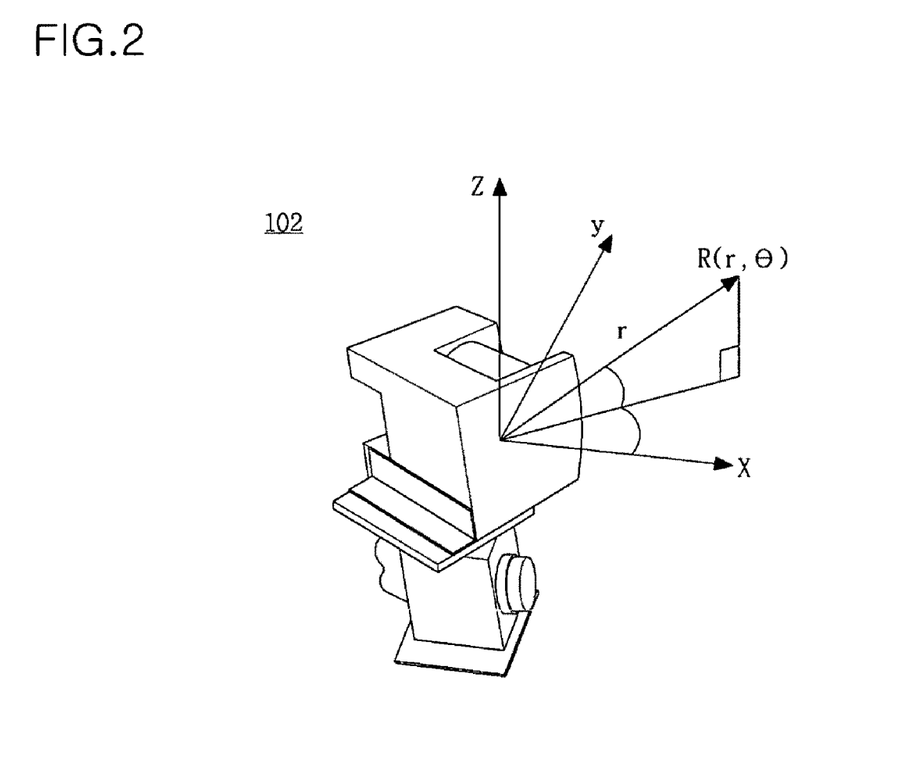
FIG. 2 illustrates a 3D distance sensor according to an exemplary embodiment.

FIG. 2 illustrates one example of a sensor according to an exemplary embodiment.

Referring to FIG. 2, the sensor 102 is capable of emitting light and detecting reflected light while rotating up, down, left and right. For example, the sensor 102 may comprise a laser diode (LD) capable of emitting light and a photodiode (PD) formed in the vicinity of the laser diode (LD) and emitting reflected light. This structure can be mounted on a rotation axis. Accordingly, light is emitted from the sensor 102 at various angles according to rotation of the rotation axis, but for convenience, up/down or vertical angles can be designated $\theta_1$ and left/right or horizontal angles can be designated $\theta_2$.

Figure 3:
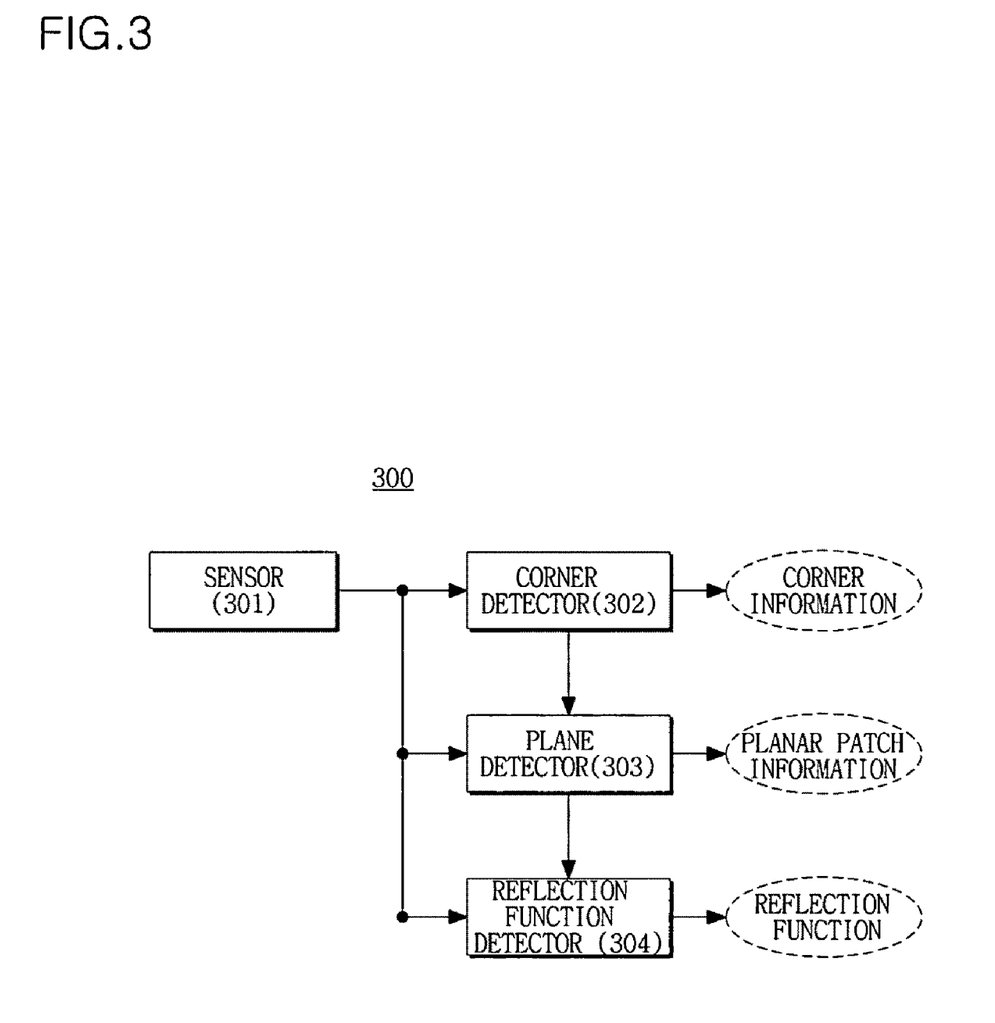
FIG. 3 illustrates a feature information extraction apparatus according to an exemplary embodiment.

FIG. 3 illustrates an example of a feature information extraction apparatus according to an exemplary embodiment.

Referring to FIG. 3, the feature information extraction apparatus 300 may include a sensor 301, a corner detector 302, a plane detector 303, and a reflection function detector 304.

The sensor 301 emits light to the surroundings, detects light reflected from surrounding objects, and acquires distance information and remission information regarding the objects. Here, the distance information may be the distance between the sensor 301 and every point on an object, and the remission information may be an amount of light reflected from an object or a planar image created based on the amount of light reflected from an object. Here, one example of the configuration of the sensor 301 is the same as in FIG. 2.

The corner detector 302 detects corner information of an object using the remission information acquired by the sensor 301.

For example, since the remission information may be a planar image created based on amount of light reflected, it is possible to detect each corner of an object in the planar image (i.e., object corners or edges). Scale invariant feature transform (SIFT) or Harris technique, etc. may be used for a corner detection algorithm.

Also, the detected corner information can be the location coordinates of a corresponding corner.

Figure 4:
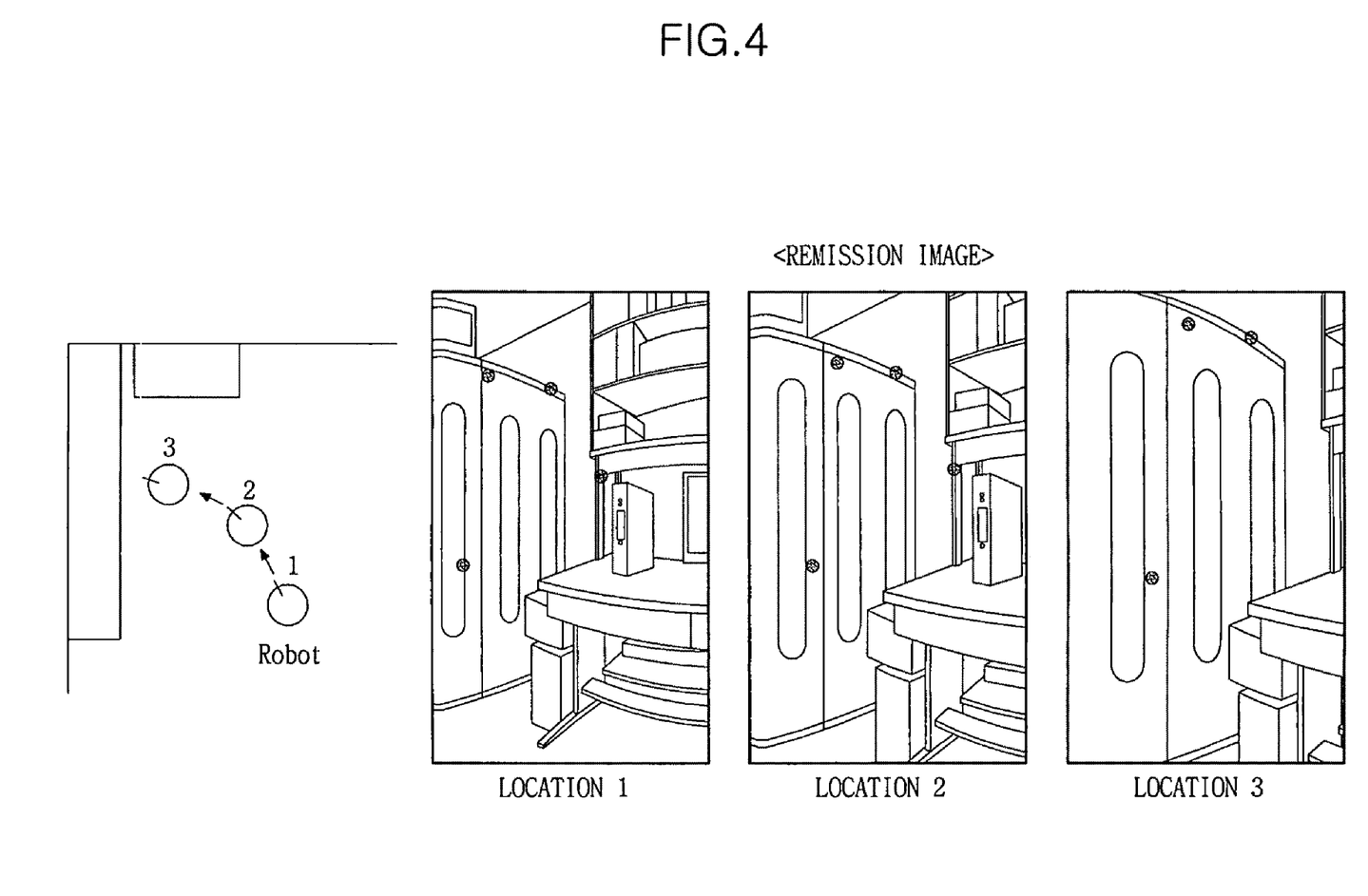
FIG. 4 illustrates detection of corner information from remission information according to an exemplary embodiment.

FIG. 4 illustrates an example of the corner detector 302 detecting corner information from the remission information using a corner detection algorithm.

The left side of FIG. 4 shows the robot 101 moving from location 1 to location 3, and the right side shows remission information acquired by the sensor 301 when the robot 101 moves like this.

Referring to FIG. 4, it can be seen that since features are detected through the remission information which is a 2D image, a corner is detected relatively uniformly regardless of change in distance and angle due to movement of the robot 101. Here, it is possible to use acquired features that are repeatedly well detected as registered features.

Referring back to FIG. 3, the plane detector 303 detects planar patch information using the corner information detected in the corner detector 302 and distance information of corresponding corner surroundings.

Figure 5:
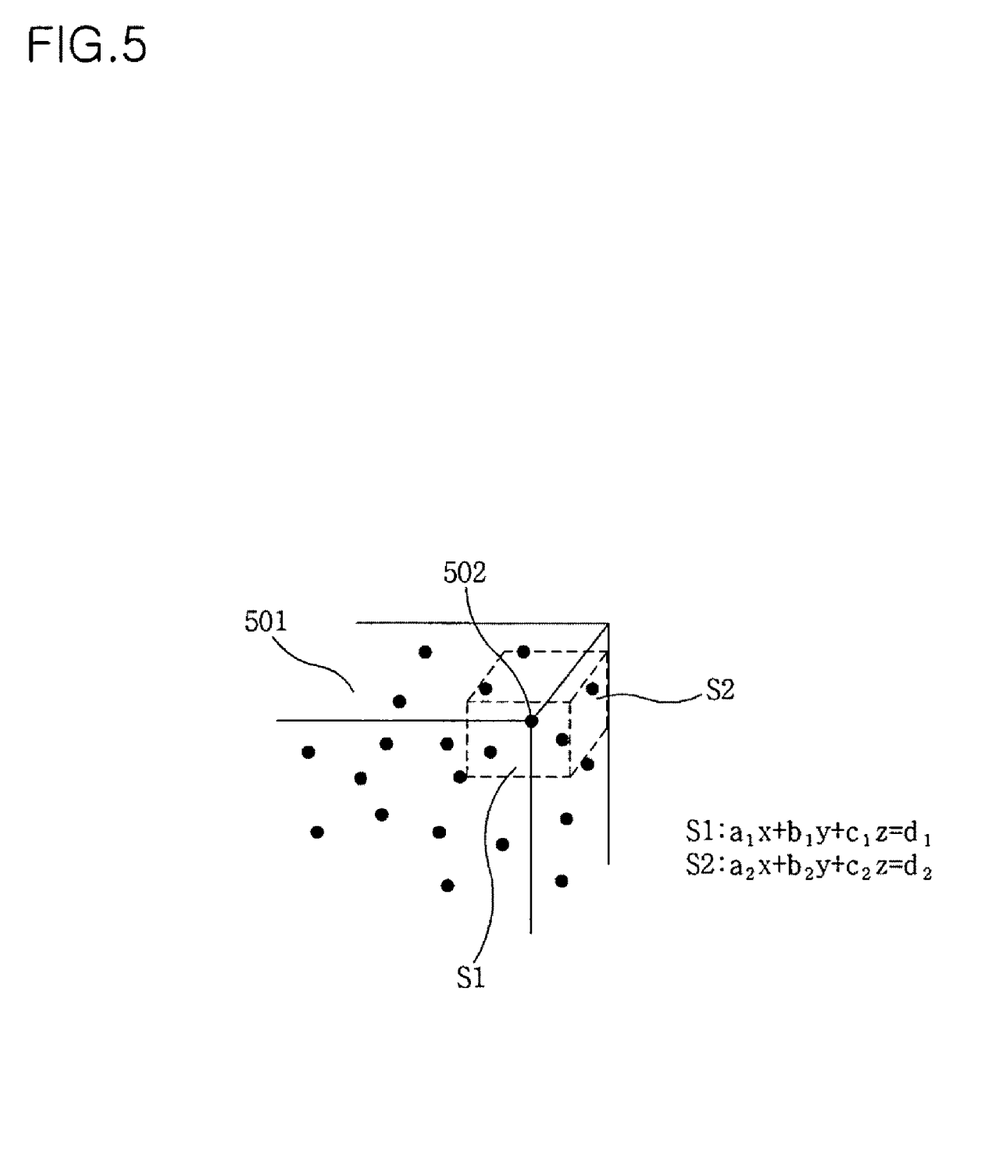
FIG. 5 illustrates detection of a planar patch according to an exemplary embodiment.

FIG. 5 illustrates an example of a planar patch according to an exemplary embodiment.

In FIG. 5, when a cube is established centered on location coordinates 502 of a corner detected in some object 501, a planar patch may be a surface (e.g., S1, S2, etc.) detected by applying a plane detection algorithm using a least squares method (LSM) to distance information included within the cube. Also, S1 and S2 may each be described by a plane equation, and the plane detector 303 may detect parameters of each plane equation as the planar patch information.

Referring back to FIG. 3, the reflection function detector 304 detects a reflection function of each planar patch detected in the plane detector 303.

The reflection function will be described first.

Figure 6:
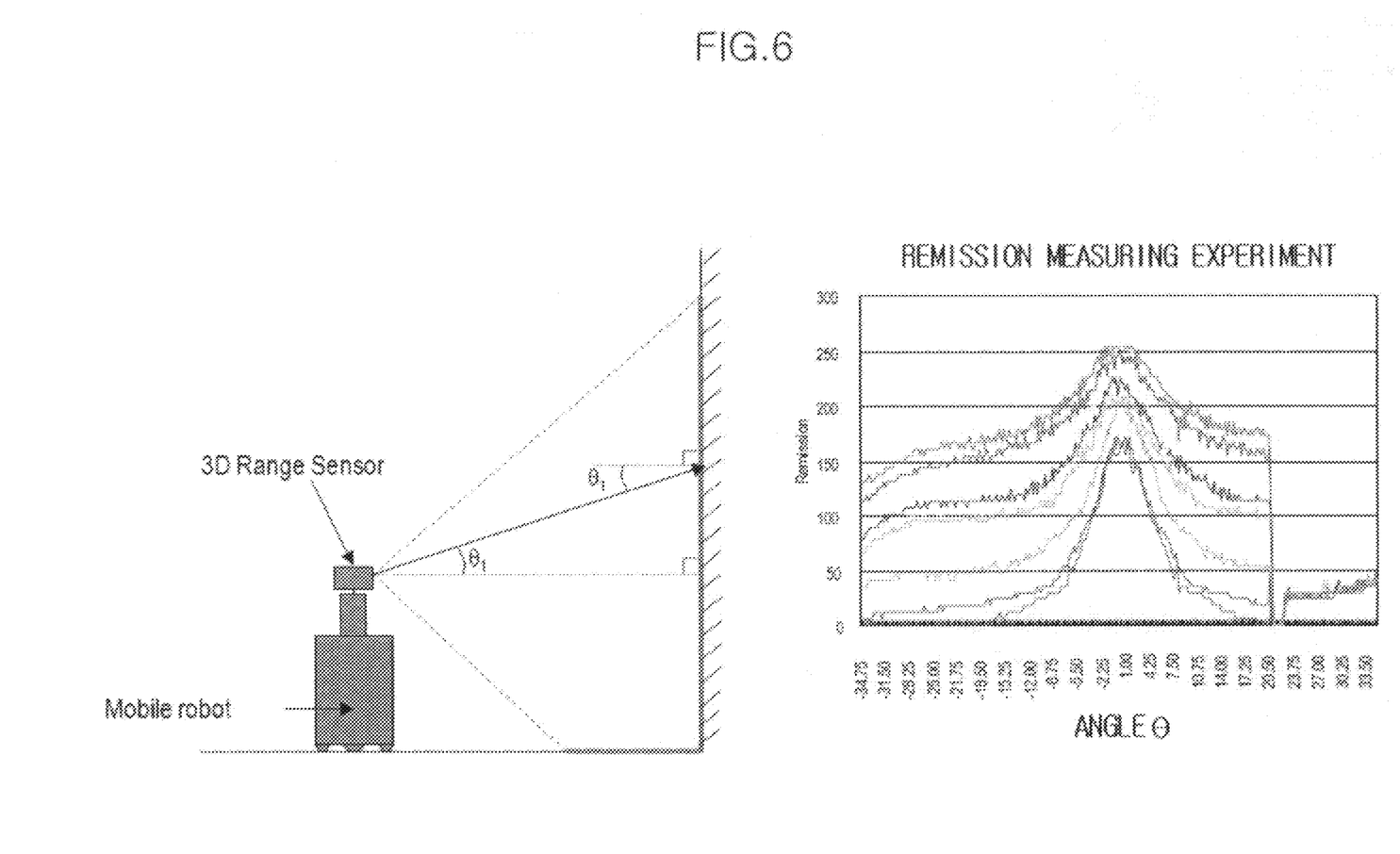
FIG. 6 illustrates a reflection function according to an exemplary embodiment.

Referring to FIG. 6, which is intended for describing the reflection function, since light is emitted from the sensor 301 at a certain angle, the angle of incidence of the light on an object can have various values. For example, when vertical incidence angle E, changes, the light reflection amount acquired according to the change, i.e., the remission information, also changes. The drawing on the right side of FIG. 6 shows remission information acquired while changing the angle of incidence. As shown, the reflection function may be defined by remission information which depends on angle of light incident on a planar patch.

Next, a method by which the reflection function detector 304 detects the reflection function will be described.

Figure 7:
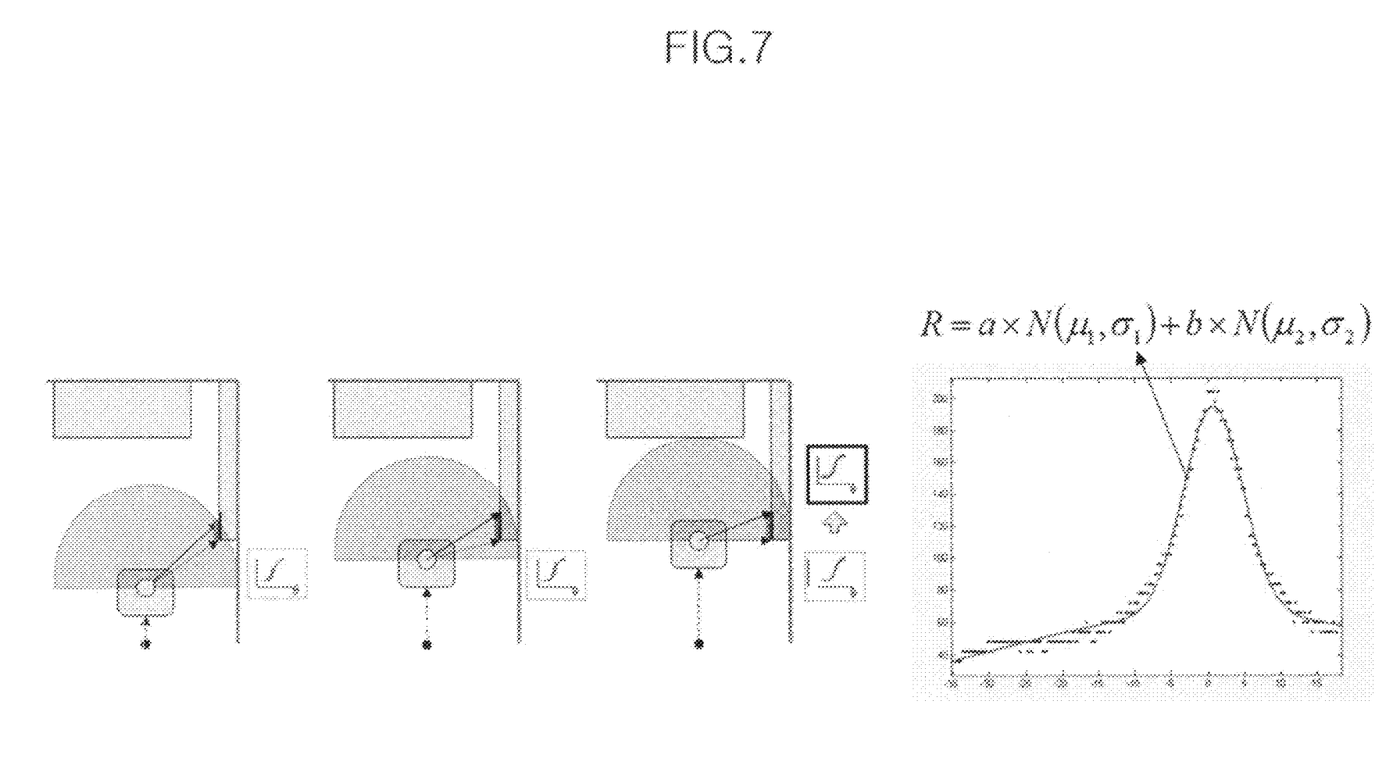
FIG. 7 illustrates computation of a reflection function according to an exemplary embodiment.

Referring to FIG. 7, the robot acquires remission information with respect to a pre-established range of angles (e.g., $\theta_2$ of about 0-30°) for a detected planar patch while moving. When the remission information for the established range of angles is all acquired (e.g., the acquired information is the same as shown on the right side of FIG. 6), a Gaussian function is fit to this information to compute a reflection function R, which will be called curve fitting.

Figure 8:
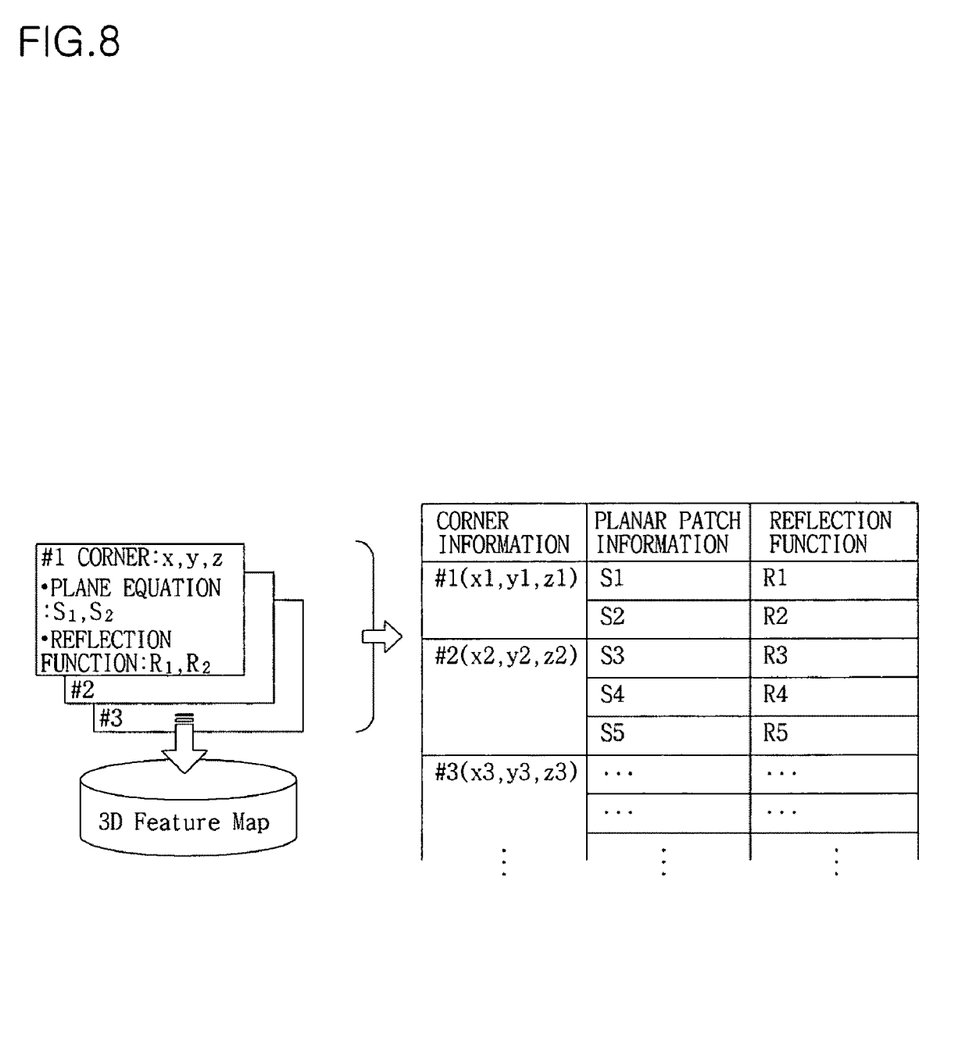
FIG. 8 illustrates feature information according to an exemplary embodiment.

FIG. 8 illustrates feature information according to an exemplary embodiment. It may be an assembly of information obtained through the feature information extraction apparatus 300 having the structure shown in FIG. 3.

Referring to FIG. 8, it can be seen that the extracted feature information may be constituted by reflection functions regarding respective planar patches corresponding to information on at least one planar patch detected based on location coordinates of a corner.

Figure 9:
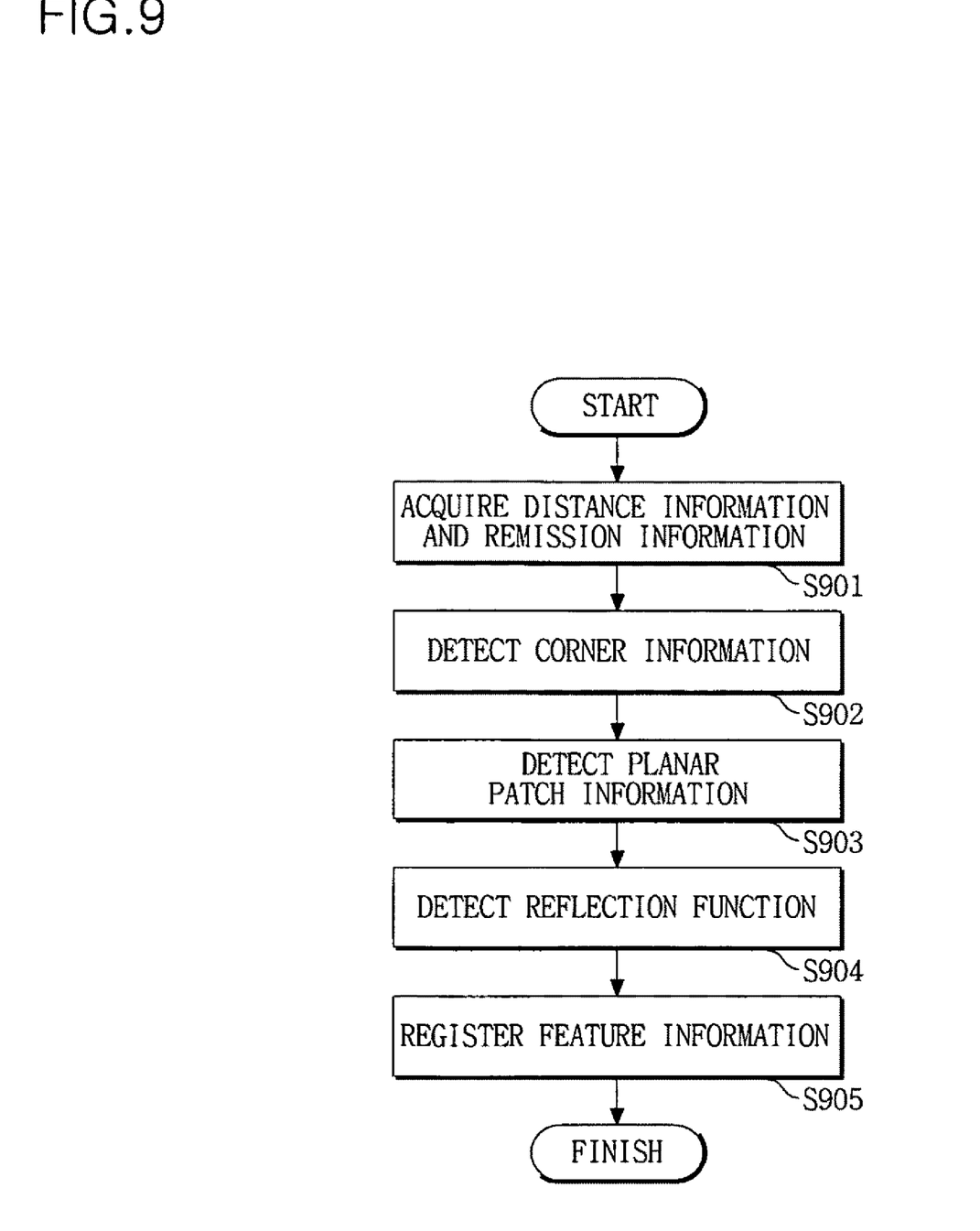
FIG. 9 illustrates a method of extracting feature information according to an exemplary embodiment.

FIG. 9 illustrates an example of a feature information extraction method according to an exemplary embodiment. It can be performed by the feature information extraction apparatus 300 having the configuration of FIG. 3.

The method of FIG. 9 will now be examined in detail.

First, in S901, distance information and remission information regarding surrounding objects is acquired. This information may be acquired by the above-described sensor 301.

Next, in S902, corner information is detected. For example, the corner detector 302 may execute a SIFT algorithm or a Harris algorithm on a planar image acquired as the remission information to detect location coordinates of a corner.

Next, in S903, planar patch information is detected. For example, the plane detector 303 establishes a cube centered on the location coordinates of a corner detected in S902 and detects a planar patch from distance information inside the cube. Here, a plane detection algorithm such as the method of least squares may be used, and the planar patch information may denote parameters of a plane equation of each planar patch.

Next, in S904, the reflection function of a planar patch is detected. For example, the reflection function detector 304 may collect remission information which depends on angle of light incident on the planar patch and fit a Gaussian function to the collected information through the curve fitting, like in FIG. 7.

Next, in S905, each of the corner information, the planar patch information, and the reflection function are registered as feature information.

Figure 10:
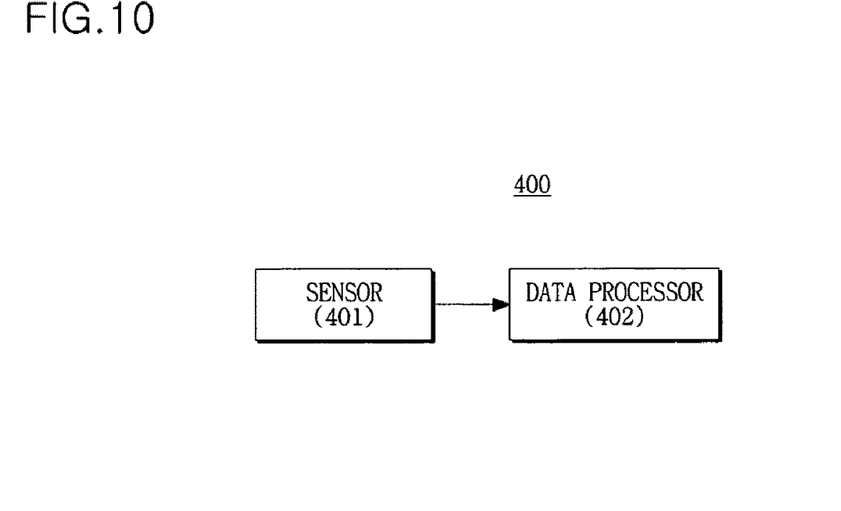
FIG. 10 illustrates a feature map creation apparatus according to an exemplary embodiment.

FIG. 10 illustrates an example of a feature map creation apparatus according to an exemplary embodiment.

In FIG. 10, a feature map creation apparatus 400 according to an exemplary embodiment is applied to a mobile robot, and may include a sensor 401 and a data processor 402 as shown.

The sensor 401 may be a 3D distance sensor installed in the robot and emitting light to the surroundings as shown in FIG.

2. Also, the sensor 401 can detect light reflected from surrounding objects and acquire distance information and remission information regarding objects.

The data processor 402 may extract feature information regarding surrounding objects from information acquired by the sensor 401 and save the extracted feature information to create a feature map. Here, the feature information may be corner location coordinates, parameters of plane equation of a planar patch around a corner, a reflection function of a planar patch, etc.

Figure 11:
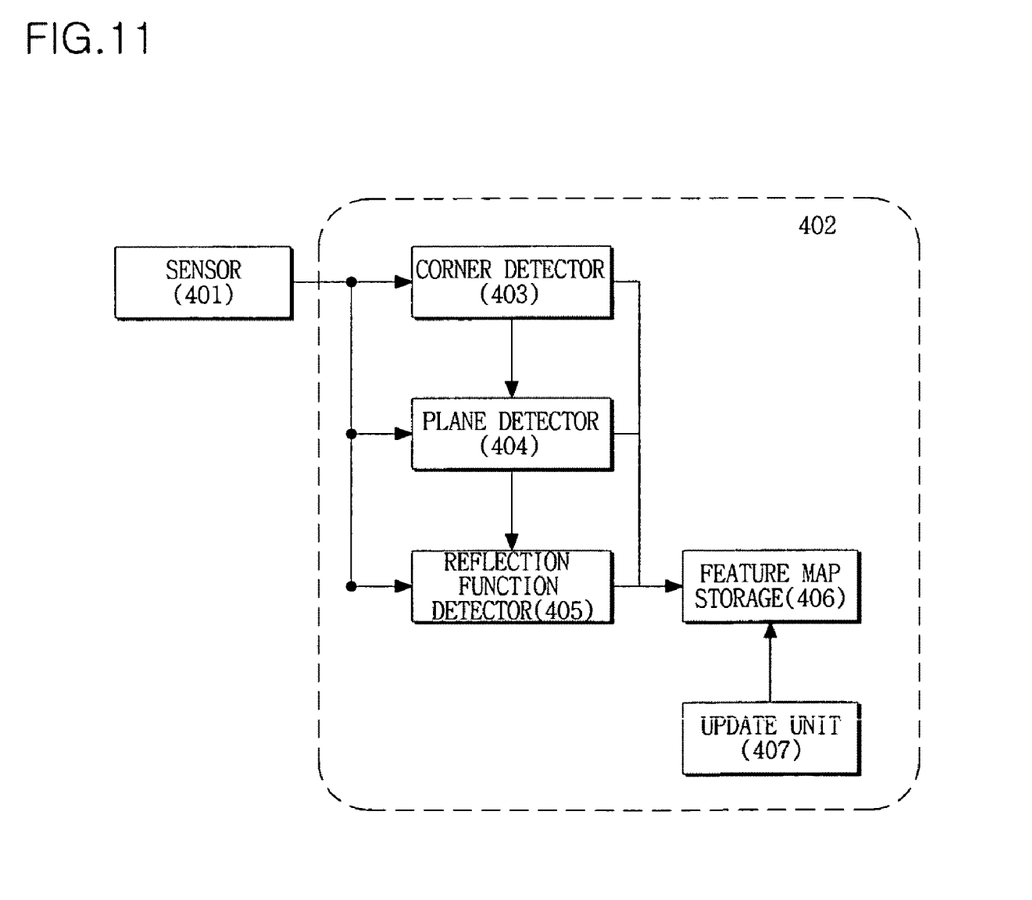
FIG. 11 illustrates a data processor according to an exemplary embodiment.

FIG. 11 illustrates an example of the data processor 402 according to an exemplary embodiment.

A corner detector 403 detects corner information regarding an object using the remission information acquired by the sensor 401. For example, it may perform a corner detection algorithm on a planar image created based on the amount of light reflected to detect location coordinates of a corresponding corner as the corner information (refer to FIG. 4).

A plane detector 404 detects planar patch information using the corner information detected in the corner detector 403 and distance information of corresponding corner surroundings. For example, as shown in FIG. 5, a cube centered on a detected corner may be established and planar patches detected from distance information inside the cube, and the planar patch information may be constituted by parameters of corresponding equations of plane. The method of least squares may be used in an algorithm for detecting planes.

A reflection function detector 405 detects a reflection function for each planar patch detected in the plane detector 404. For example, as described with reference to FIGS. 6 and 7, collect remission information which depends on angle of light incident on the planar patch may be collected and presumed to be a Gaussian function through the curve fitting.

A feature map storage 406 stores the detected corner information, planar patch information, and reflection function information as feature information. For example, as shown in FIG. 8, at least one of planar patch information and a reflection function regarding a corresponding planar patch may be stored based on location coordinates of a corner.

An update unit 407 performs a function of matching current feature information sensed as the robot performs its tasks with feature information stored in the feature map storage 406 to correct the location of the robot, and updating the stored feature information.

Figure 12:
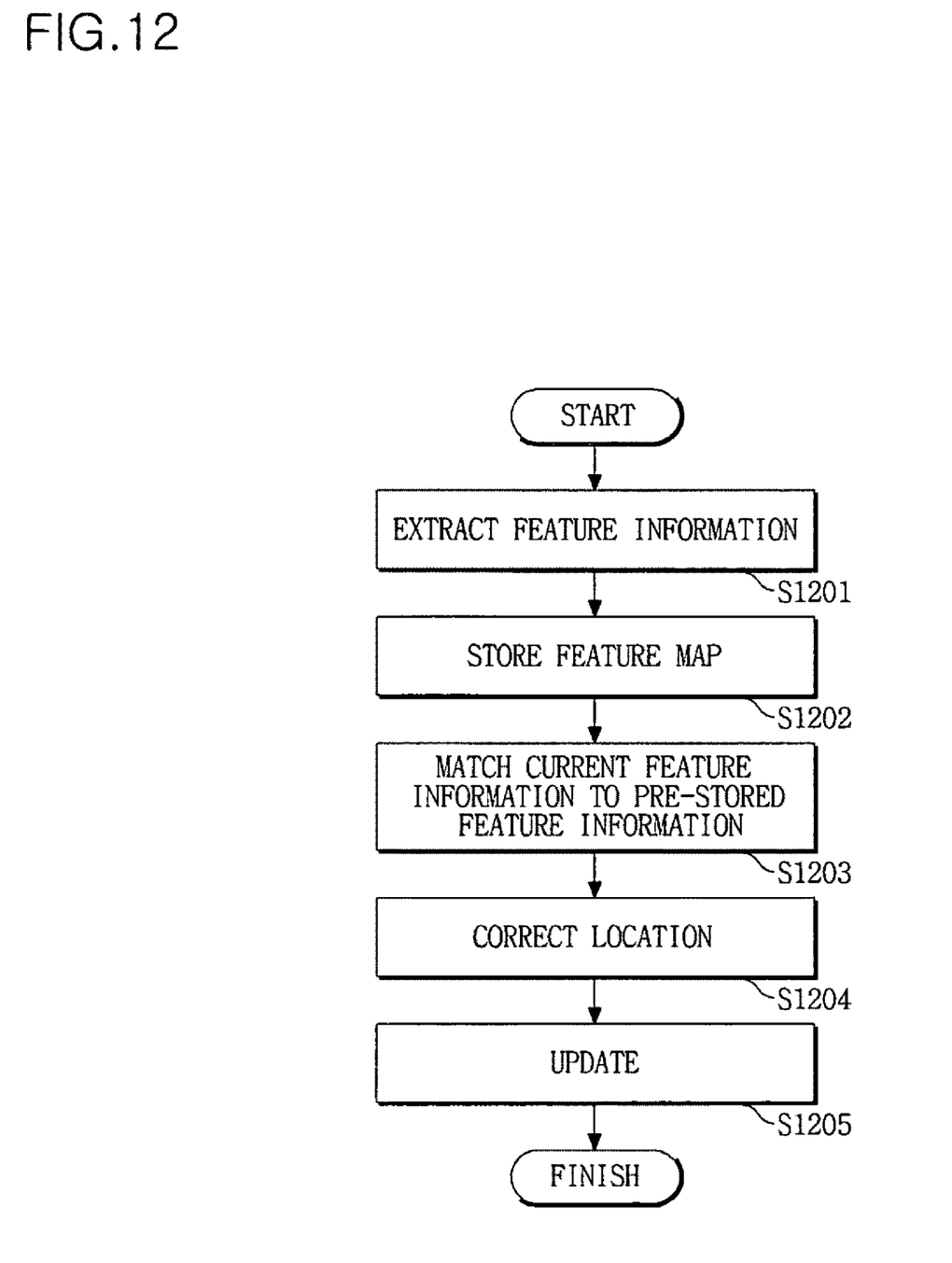
FIG. 12 illustrates a feature map creation method according to an exemplary embodiment.

FIG. 12 illustrates an example of a feature map creation method according to an exemplary embodiment. The method may be performed by the structure of FIG. 10 or 11.

The method of claim 12 will now be described in detail.

First, in S1201, feature information regarding surroundings is extracted. The method illustrated in FIG. 9 may be employed as the extraction method and thus a detailed description of the extraction method will be omitted.

Next, in S1202, the extracted information is stored as feature map information. For example, corner information, planar patch information, reflection function, etc. may be feature information.

Next, in S1203, matching is performed between current feature information and pre-stored feature information.

Next, in S1204, the location of the robot is reflected in the matched feature information and that location is corrected. For example, when the currently collected feature information is most similar to feature information detected at location A among the pre-stored feature information, the robot may be moved to location A.

Next, in S1205, the stored feature information is updated according to the movement of the robot's location.

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An apparatus for extracting feature information of environmental objects, comprising:
   a sensor to detect light reflected from the environmental objects to acquire distance information and remission information regarding the environmental objects;
   a corner detector to detect corner information regarding the environmental objects using the remission information;
   a plane detector to detect planar patch information using the corner information and distance information of surroundings corresponding to a corner; and
   a reflection function detector to detect a reflection function of the planar patch using the remission information depending on angle of light incident on the planar patch.

2. The apparatus according to claim 1, wherein at least one of the corner information, the planar patch information, and the reflection function is used as the feature information of the environmental objects.

3. The apparatus according to claim 2, wherein the corner information includes location coordinates of the corresponding corner, the planar patch information includes plane equation parameters of the planar patch, and the reflection function includes reflection function parameters of the planar patch.

4. The apparatus according to claim 1, wherein the corner information includes location coordinates of corners of the environmental objects, and the plane detector establishes a cube centered on the corner location coordinates and detects at least one piece of planar patch information from distance information of the cube.

5. The apparatus according to claim 1, wherein the reflection function detector computes the reflection function by curve fitting a Gaussian function of the remission information.

6. An apparatus for creating a feature map for localization of a mobile robot, comprising:
- a sensor to detect light reflected from environmental objects to acquire distance information and remission information regarding the environmental objects; and
- a data processor to extract feature information which include corner information, planer patch information and a reflection function of the planer patch using the distance information and the remission information, and to store the extracted feature information to create the feature map.

7. The apparatus according to claim 6, wherein the corner information includes location coordinates of a corresponding corner, the planar patch information includes plane equation parameters of the planar patch, and the reflection function includes reflection function parameters of the planar patch.

8. The apparatus according to claim 6, wherein the data processor comprises:
- a corner detector to detect the corner information regarding the environmental objects using the remission information;
- a plane detector detects the planar patch information using the corner information and distance information of surroundings corresponding to a corner;
- a reflection function detector to detect the reflection function of the planar patch using the remission information which depends on angle of light incident on the planar patch; and
- a feature map storage to store at least one of the corner information, the planar patch information, or the reflection function of the planar patch.

9. The apparatus according to claim 8, wherein the data processor further comprises:
- an update unit to match current feature information with stored feature information to correct the location of the robot and to update the stored feature information.

10. The apparatus according to claim 8, wherein the corner information includes location coordinates of corners of the environmental objects, and the plane detector establishes a cube centered on the corner location coordinates and detects at least one piece of planar patch information from distance information of the cube.

11. The apparatus according to claim 8, wherein the reflection function detector computes the reflection function by curve fitting a Gaussian function of the remission information.

12. A feature information extraction method for creation of a feature map, comprising:
- detecting light reflected from environmental objects to acquire distance information and remission information regarding the environmental objects;
- detecting corner location coordinates regarding the environmental objects as corner information using the remission information;
- establishing, using at least one processor, a cube centered on the corner location coordinates using the detected corner location coordinates and distance information of surroundings corresponding to a corner, and detecting planar patch information from distance information of the cube;
- detecting a reflection function of the planar patch using the remission information which depends on angle of light incident on the planar patch; and
- extracting and storing at least one of the corner information, the planar patch information, and the reflection function as the feature information.

13. The method according to claim 12, wherein the remission information is an amount of light reflected from the environmental objects or a plane image created based on the amount of light reflected from the environmental objects.

14. The method according to claim 12, wherein the reflection function is computed by curve fitting a Gaussian function of the remission information.

15. A method for creating a feature map for localization of a mobile robot, comprising:
- detecting light reflected from environmental objects to acquire distance information and remission information regarding the environmental objects;
- detecting corner location coordinates regarding the environmental objects as corner information based on the remission information;
- establishing, using at least one processor, a cube centered on the corner location coordinates using the detected corner location coordinates and distance information of surroundings corresponding to a corner, and detecting planer patch information from distance information of the cube;
- detecting a reflection function of the planar patch using remission information which depends on angle of light incident on the planar patch;
- extracting and storing at least one of the corner information, the planar patch information, and the reflection function as feature information; and
- matching current feature information with stored feature information to correct a position of the robot and updating the stored feature information.

16. The method according to claim 15, wherein the remission information is an amount of light reflected from the environmental objects or a plane image created based on the amount of light reflected from the environmental objects.

17. The method according to claim 15, wherein the reflection function is computed by curve fitting a Gaussian function of the remission information.

18. At least one computer readable medium storing computer readable instructions that control at least one processor to implement a feature information extraction method for creation of a feature map, comprising:
- detecting light reflected from environmental objects to acquire distance information and remission information regarding the environmental objects;
- detecting corner location coordinates regarding the environmental objects as corner information using the remission information;
- establishing a cube centered on the corner location coordinates using the detected corner location coordinates and distance information of surroundings corresponding to a corner, and detecting planar patch information from distance information of the cube;
- detecting a reflection function of the planar patch using the remission information which depends on angle of light incident on the planar patch; and
- extracting and storing at least one of the corner information, the planar patch information, and the reflection function as the feature information.

19. At least one computer readable medium storing computer readable instructions that control at least one processor to implement a method for creating a feature map for localization of a mobile robot, comprising:
- detecting light reflected from environmental objects to acquire distance information and remission information regarding the environmental objects;
- detecting corner location coordinates regarding the environmental objects as corner information based on the remission information;

establishing a cube centered on the corner location coordinates using the detected corner location coordinates and distance information of surroundings corresponding to a corner, and detecting planer patch information from distance information of the cube;

detecting a reflection function of the planar patch using remission information which depends on angle of light incident on the planar patch;

extracting and storing at least one of the corner information, the planar patch information, and the reflection function as feature information; and matching current feature information with stored feature information to correct a position of the robot and updating the stored feature information.

* * * * *

UNITED STATES PATENT AND TRADEMARK OFFICE
CERTIFICATE OF CORRECTION

PATENT NO. : 8,352,075 B2
APPLICATION NO. : 12/457203
DATED : January 8, 2013
INVENTOR(S) : Joon-kee Cho et al.

It is certified that error appears in the above-identified patent and that said Letters Patent is hereby corrected as shown below:

In the Claims:

Column 9; Line 7; In Claim 6, delete "include" and insert -- includes --, therefor.

Signed and Sealed this
Fourteenth Day of May, 2013

Teresa Stanek Rea
*Acting Director of the United States Patent and Trademark Office*